United States Patent
Bal et al.

(10) Patent No.: US 9,889,434 B2
(45) Date of Patent: Feb. 13, 2018

(54) NI—PT—ZRO2 NANOCRYSTALLINE OXIDE CATALYST AND PROCESS THEREOF USEFUL FOR THE PRODUCTION OF SYNGAS BY COMBINING OXY-DRY REFORMING OF NATURAL GAS

(71) Applicant: Council of Scientific & Industrial Research, New Delhi (IN)

(72) Inventors: Rajaram Bal, Uttrakhand (IN); Bipul Sarkar, Uttrakhand (IN); Reena Goyal, Uttrakhand (IN); Ankur Bordoloi, Uttrakhand (IN); Chandrashekar Pendem, Uttrakhand (IN); Laxmi Narayan Sivakumar Konathala, Uttrakhand (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 15/233,572

(22) Filed: Aug. 10, 2016

(65) Prior Publication Data
US 2017/0043324 A1    Feb. 16, 2017

(30) Foreign Application Priority Data
Aug. 11, 2015 (IN) .......................... 2464/DEL/2015

(51) Int. Cl.
| | | |
|---|---|---|
| B01J 21/06 | (2006.01) | |
| B01J 23/89 | (2006.01) | |
| B01J 35/00 | (2006.01) | |
| B01J 35/10 | (2006.01) | |
| B01J 37/00 | (2006.01) | |
| B01J 37/03 | (2006.01) | |
| B01J 37/06 | (2006.01) | |

(Continued)

(52) U.S. Cl.
CPC ............ *B01J 23/892* (2013.01); *B01J 21/066* (2013.01); *B01J 35/0013* (2013.01); *B01J 35/1014* (2013.01); *B01J 37/009* (2013.01); *B01J 37/0072* (2013.01); *B01J 37/035* (2013.01); *B01J 37/06* (2013.01); *B01J 37/088* (2013.01); *C01B 3/40* (2013.01); *C01B 2203/0238* (2013.01); *C01B 2203/0261* (2013.01); *C01B 2203/107* (2013.01); *C01B 2203/1058* (2013.01); *C01B 2203/1082* (2013.01); *C01B 2203/1241* (2013.01); *Y02P 20/52* (2015.11)

(58) Field of Classification Search
None
See application file for complete search history.

(56) References Cited

PUBLICATIONS

"Study of Ni and Pt catalysts supported on alpha-Al2O3 and ZrO2 applied in methane reforming with CO2," Pompeo et al, Applied Catalysis A: General 316, pp. 175-183 (2007).*

(Continued)

*Primary Examiner* — Colin W. Slifka
(74) *Attorney, Agent, or Firm* — Seyfarth Shaw LLP

(57) ABSTRACT

The present invention provides a process and catalyst for the autothermal and dry reforming of methane to produce syngas. The process provides a direct single step gas phase reforming of methane or natural gas to syngas over Ni—Pt supported nanocrystalline $ZrO_2$. The process provides methane conversion of 54-99% with $H_2/CO$ ratio of 1.14 to 1.42 (mol %) in the temperature range of 250 to 750 800° C. at atmospheric pressure.

1 Claim, 4 Drawing Sheets

(51) Int. Cl.
*B01J 37/08* (2006.01)
*C01B 3/40* (2006.01)

(56) References Cited

PUBLICATIONS

"Effect of oxygen addition to steam and dry reforming of methane on bed temperature profile over Pt and Ni catalysts," Tomishige et al, Fuel Processing Technology 85, pp. 1,103-1,120 (2004).*

* cited by examiner

NI—PT—ZRO2 NANOCRYSTALLINE OXIDE CATALYST AND PROCESS THEREOF USEFUL FOR THE PRODUCTION OF SYNGAS BY COMBINING OXY-DRY REFORMING OF NATURAL GAS

FIELD OF THE INVENTION

The present invention relates Ni—Pt—ZrO$_2$ nanocrystalline oxide catalyst and process thereof useful for the production of Syngas by Combining Oxy- Dry Reforming of Natural Gas. Particularly the present invention relates to a catalyst for the gas phase production of selective syngas under atmospheric pressure. More particularly, the present invention relates to a process to produce syngas from low-quality natural gas/methane with high conversion with a H$_2$/CO ratio of 1.5 in one single step. The present invention relates to an improved process for the preparation of Ni—Pt bimetallic metal oxide supported nanocrystalline ZnO$_2$; the catalyst can offer syngas with high H$_2$/CO ratio without any deactivation in a longer run up to 100 h.

BACKGROUND OF THE INVENTION

Syngas, or Synthesis Gas; an adjustable composition mixture of hydrogen and carbon monoxide (with some carbon dioxide),a direct product of the gasification process of carbon rich feedstock's, has 50% less energy density than natural gas. This property makes the basis of Fischer-Tropsch synthesis and ideal for the production of transportation fuel as well as other chemical products. Syngas, is chiefly used as an intermediary unit in the production of various fuels; including: synthetic petroleum oil, methanol and lower olefins. Petrochemical industry produces vast quantities of syngas, mostly by an expensive method called steam reforming; reacting methane with steam at high temperatures. Though, the process consume lots of energy, as the steam reforming is strongly endothermic (equation 1).

$$CH_4 + H_2O \rightarrow CO + 3H_2 \quad (1)$$

$$\Delta H_{298K} = 206 \text{ kJ·mol}^{-1}$$

$$CH_4 + CO_2 \rightarrow 2CO + 2H_2 \quad (2)$$

$$\Delta H_{298K} = 247 \text{ kJ·mol}^{-1}$$

$$CH_4 + \tfrac{1}{2}O_2 \rightarrow CO + 2H_2 \quad (3)$$

$$\Delta H_{298K} = -36 \text{ kJ·mol}^{-1}$$

However, the potential future effect of climate perturbation causes from endless emission of CO$_2$ in earth atmosphere includes more frequent wildfires, longer periods of drought in some regions and an increase in tropical storms. Hence, utilization plentifully available CO$_2$ coupled with methane or natural gas (shale gas) is viewed as a potential player in syngas industry. The partial oxidation of methane is an exothermic reaction (equation 3) with large heat production, whereas the dry reforming of methane is an endothermic in nature. But the conversion efficiency of partial oxidation is low as the generated heat is wasted. Thereby, the efficiency can be furnished by combine partial oxidation with dry reforming of methane, since dry reforming can absorbs the thermal energy from surrounding. Thermo-neutral condition can be overcome adjusting the exothermicity and endothermicity of the reaction by choosing an appropriate ratio of methane: oxygen: carbon dioxide. Ni based nanomaterial's have been recognized as the most promising catalyst, due to high activity, low cost and extensive availability. But rapid deactivation of Ni based catalyst causes by coke deposition and support sintering desiccates the possibility of commercialization of Ni based catalyst. Therefore, development of a robust Ni composite catalyst with a blend of admirable activity, stability, and good resistance to coke and sintering is highly desirable from both an academic and industrial viewpoint.

Reference can be made to the article in Fuel 87, 2008, 1348-135 wherein J. Guo et al. provided a combined oxy-CO$_2$ reforming of methane over Gd modified Ni/SiO$_2$ catalysts for the production of syngas. But at 750° C. ~92% methane conversion was monitored furthermore the GHSV was also quite low for it's industrial application.

Reference can be made to the article Fuel 85, 2006, 2484-2488 in which Choudhary et al. studied CoO$_x$/MgO/SA-5205 catalyst for oxy-CO$_2$ reforming of methane or natural gas. But, the conversion of methane is only 80% at 750° C. whereas the conversion goes to 100% at around 850° C. Moreover, the catalyst deactivates fast as only 20 h time-on-steam was detailed.

Reference can be made to the Applied Energy 83, 2006, 1024-1032 wherein V. R. Choudhary et al. reported an NdCoO$_3$ perovskite-type catalyst for CO$_2$ reforming of methane combined with steam reforming or partial oxidation of methaneto syngas. Under the reported process 90% methane conversion was observed at 800° C. but the catalyst also shows rapid deactivation via coke formation over the active metal.

Reference may also be made to Fuel Processing Technology 85, 2004, 1103-1120, in which effect of oxygen in steam and dry reforming of methane was studied over Pt and Ni catalysts. A methane conversion of ≥86% was achieved over Ni(10)/Al$_2$O$_3$ catalyst at 850° C. while with Ni(10)/Al$_2$O$_3$ 90% methane conversion can be achieved. But main drawback is the use of high amount of Ni to achieve such methane conversion. Use of such a high amount of Ni is proven to cause rapid agglomeration and coking during the reforming process.

OBJECTS OF THE INVENTION

The main object of the present invention is to provide a nanocrystalline oxide catalyst for the combination of oxy- and dry reforming of methane with high syngas selectivity.

Another object of the present invention is to provide a process, which selectively gives syngas from methane in combination with molecular oxygen and carbon dioxide with CO/H$_2$ ratio equal to 1.5.

Yet another object of the present invention is to provide a process and catalyst which uses two greenhouse gases at a time to produce syngas for future fuel alternatives.

Still another objective of the present invention is to prepare Ni—Pt—ZrO$_2$ catalyst by colloidal and hydrothermal route.

Yet another object of the present invention is to provide a process which works continuously more than 100 h without any deactivation of reforming catalyst under continuous process for the production of syngas by combining of oxy- and dry reforming of methane.

Yet another object of the present invention is to provide a bimetallic Ni—Pt catalyst and which can be prepared easily and also very economical to produce syngas from autothermal as well as dry reforming of methane.

SUMMARY OF THE INVENTION

Accordingly, the present invention provides Ni—Pt—ZrO$_2$ nanocrystalline oxide catalyst, wherein Ni is in the range of 2-10 wt %, Pt is in the range of 0.5 to 4 wt % and $ZrO_2$ in the range of 97.5 to 86 wt % having particle size in the range of 30-80 nm.

In an embodiments of the present invention, Ni—Pt—$ZrO_2$ nanocrystalline oxide catalyst is useful for partial oxidation and dry reforming of methane for the production of syngas via gas phase reforming of methane or natural gas.

In another embodiments of the present invention, Ni—Pt—$ZrO_2$ nanocrystalline oxide catalyst, having following characteristics:

BET surface area: 85 m$^2$/g;
particle size of the catalyst ranges between 30-60 nm;
Catalyst runs for 100 hrs without deactivation.

Accordingly, the present invention also provides a process for the preparation of Ni—Pt—$ZrO_2$ nanocrystalline oxide catalyst as claimed in claim 1, wherein the said process comprising the steps of:

i. dissolving 0.025 to 0.0372 mol of $ZrOCl_2$ in 2.78 to 5.56 mol of water, wherein the mole ratio of $ZrOCl_2$:$H_2O$ ranges between 180-400 in the solution with pH in the range of 3-10 using $NH_4OH$ solution;

ii. transferring the mixture of step i) to a stainless steel autoclave and heating at a temperature in the range of 50 to 70° C. for a period in the range of 1 to 2 h to obtain white precipitate;

iii. filtering, washing and drying the white precipitate as obtained in step ii) at a temperature in the range of 100 to 130° C. for period in the range of 10 to 18 hrs;

iv. calcining the materials as obtained in step iii) at a temperature in the range of 300 to 800° C. for period in the range of 4 to 6 h in air to get solid $ZrO_2$;

v. mixing 0.1-0.3 mmol of $H2PtCl_6.6H_2O$ and 0.2-0.4 mmol of $Ni(NO_3)_2.6H_2O$ in 70-95 vol % of liquid octadecylamine (ODA), heating the mixture at temperature range of 100-140° C., further heating the content up to 220° C. after transferring the mixture to a lined stainless steel autoclave and stirring for 10 minutes followed by adding 0.008 to 0.016 mmol of $ZrO_2$, a support material as obtained in step (iv) by maintaining weight ratio of Ni—Pt: $ZrO_2$ in the range of 86-97.5%;

vi. stirring the mixture as obtained in step (v) for a period in the range of 1 to 2 h, and subjecting the reaction mixture for ultrasonic treatment for a period in the range of 40-60 minutes at room temperature in the range of 25-35° C. after adding concentrated nitric acid in the range of 2.0-5.0 ml to obtain precipitate;

vii. cooling precipitate of step vi) to room temperature in the range of 25-35° C., collecting and washing the precipitate with ethanol for 2-3 times followed by drying the materials in oven at a temperature ranging between 100 to 130° C. for a period in the range of 10 to 18 h;

viii. calcining the material of step vii) at a temperature in the range of 300 to 800° C. for a period in the range of 4 to 6 h in air to obtain nanocrystalline oxide Ni—Pt—$ZrO_2$ catalyst.

Accordingly, the present invention also provides a process for the production of syngas by gas phase oxy-dry reforming of methane or natural gas using Ni—Pt—$ZrO_2$ nanocrystalline oxide catalyst, wherein the said process comprising the steps of:

i. passing a mixture of methane, carbon dioxide, oxygen with helium in a ratio of 1:1:0.5:7.5 at atmospheric pressure, at a temperature in the range of 250-750° C. with a gas hourly space velocity (GHSV) in the range of 12000-42000 ml g-1 h-1 over Ni—Pt supported $ZrO_2$ catalyst (range of quantity) with Ni to $ZrO_2$ weight ratio varied between 2 to 10% and Pt to $ZrO_2$ in the range of 0.5-4% for a period of 1-100 hours to obtain syngas.

In an embodiment of the present invention, reaction temperature is preferably in the range 450 to 750° C.

In another embodiment of the present invention, the gas hourly space velocity (GHSV) is preferably in the range of 12000-20000 ml $g^{-1}$ $h^{-1}$.

In yet another embodiment of the present invention, the reaction time used is preferably in the range 1 to 70 h.

In still another embodiment of the present invention, the conversion percentage of methane is in the range of 54 to 99 mol %.

In yet another embodiment of the present invention, the $H_2$/CO ratio in the syngas is 0.91 to 1.4.

For the first time, nanocrystalline Ni—Pt—Zr oxide catalyst is prepared by hydrothermal method with particle size in the 30-80 nm range. This catalyst is highly active for the production of synthesis gas from the mixture of two green house gases ($CH_4$ and $CO_2$), oxygen and helium, $CH_4$+$O_2$+$CO_2$+He (combining dry and oxy reforming) at a temperature range between 300° C. and 800° C. The typical mole ratio of the feed mixture was $CH_4$:$CO_2$:$O_2$+He:1:1:0.5:7.5. The catalyst does not deactivate till 100 h at atmospheric pressure.

Preparation of nanostructured Ni—Pt—$ZrO_2$ catalyst was carried out by using colloidial and hydrothermal route. $Ni(NO_3)_2.6H2O$, $H_2PtCl_6.6H_2O$ and $ZrOCl_2$ was taken as Ni, Pt and Zr source respectively. Initially, $ZrO_2$ support was prepared by hydrothermal method at 60° C. for 2 h using Zr source, ammonium hydroxide at a pH of 10. Finally the material was calcined at 750° C. for 5 h. The Ni—Pt was incorporated by using colloidial method first then hydrothermal method. In the colloidial method Ni and Pt salt was dissolved in octadecylamine and heated at 120° C. Then it was hydrothermally treated at 220° C. for 10 min and $ZrO_2$ was added and heated for another 30 min at 220° C. Finally the calcination of the material was carried out at 750° C. for 6 h in air to get nanocrystalline Ni—Pt—Zr oxide.

Use of this catalyst resulting into high conversion of methane with high $H_2$/CO ratio.

BRIEF DESCRIPTION OF THE INVENTION

Nanocrystalline Ni—Pt—Zr oxide catalyst is prepared by hydrothermal method with particle size in the 30-80 nm range. This catalyst is highly active for the production of synthesis gas from the mixture of two green house gases ($CH_4$ and $CO_2$), oxygen and helium, $CH_4$+$O_2$+$CO_2$+He (combining dry and oxy reforming) at a temperature range between C. The typical mole ratio of the feed mixture was $CH_4$:$CO_2$:$O_2$+He:1:1:0.5:7.5. The catalyst does not deactivate till 100 h at atmospheric pressure.

Preparation of nanostructurd Ni—Pt—$ZrO_2$ catalyst was carried out by using colloidial and hydrothermal route. $Ni(NO_3)_2.6H2O$, $H_2PtCl_6.6H_2O$ and $ZrOCl_2$ was taken as Ni, Pt and Zr source respectively. Initially, $ZrO_2$ support was prepared by hydrothermal method at 60° C. for 2 h using Zr source, ammonium hydroxide at a pH of 10. Finally the material was calcined at 7500 C. for 5 h. The Ni—Pt was incorporated by using colloidial method first then hydrothermal method. In the colloidial method Ni and Pt salt was dissolved in octadecylamine and heated at 120° C. The it was hydrothermally treated at 220° C. for 10 min and $ZrO_2$ was added and heated for another 30 min 220° C. Finally the calcination of the C for 6 h in air to get nanocrystalline material was carried out at 750 Ni—Pt—Zr oxide.

DETAILED DESCRIPTION OF THE INVENTION

Figure 1:
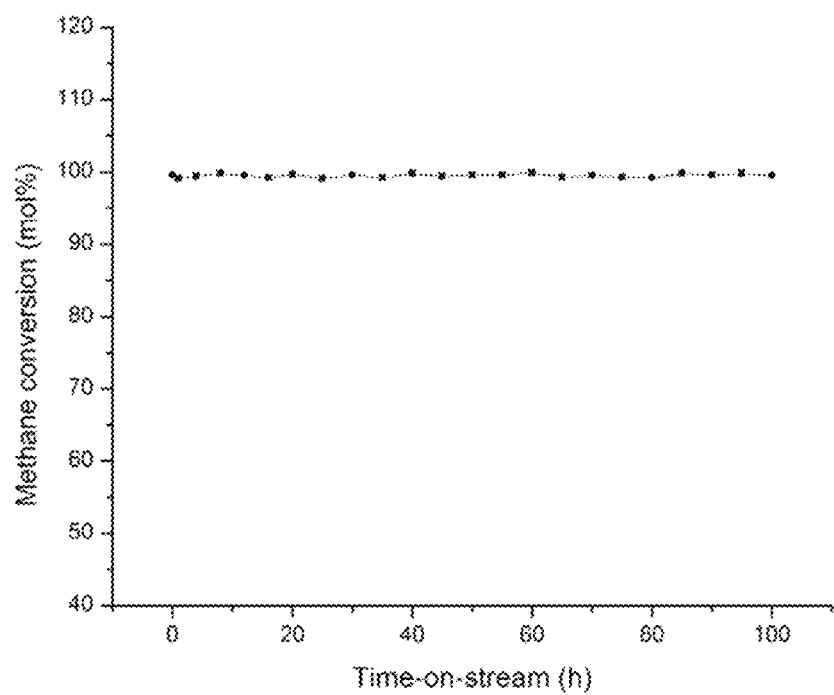
FIG. 1 represents the conversion of methane over time on stream for the Ni—Pt—ZrO$_2$ catalyst.
Figure 2:
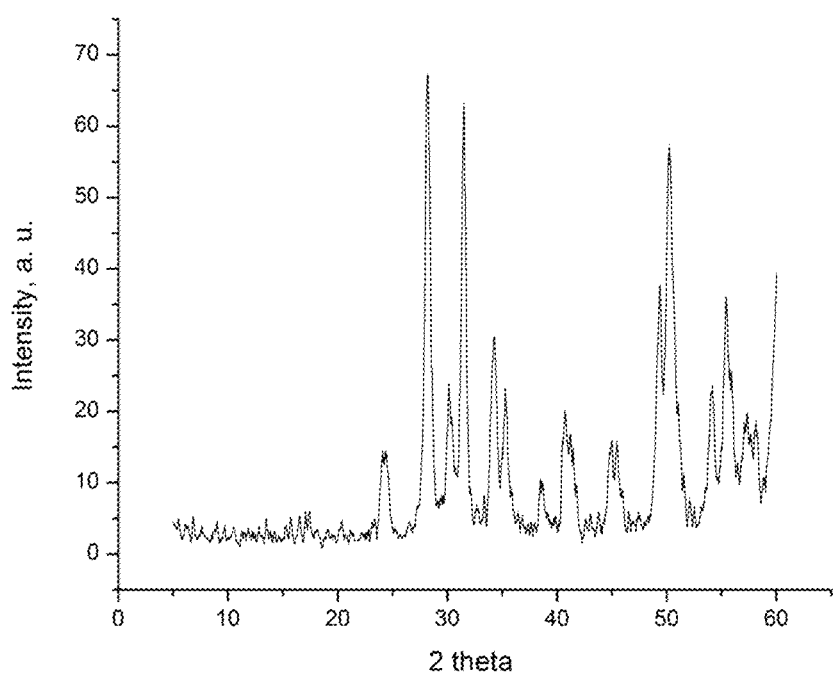
FIG. 2 represents X-ray Diffraction (XRD) pattern of the prepared catalyst.
Figure 3:
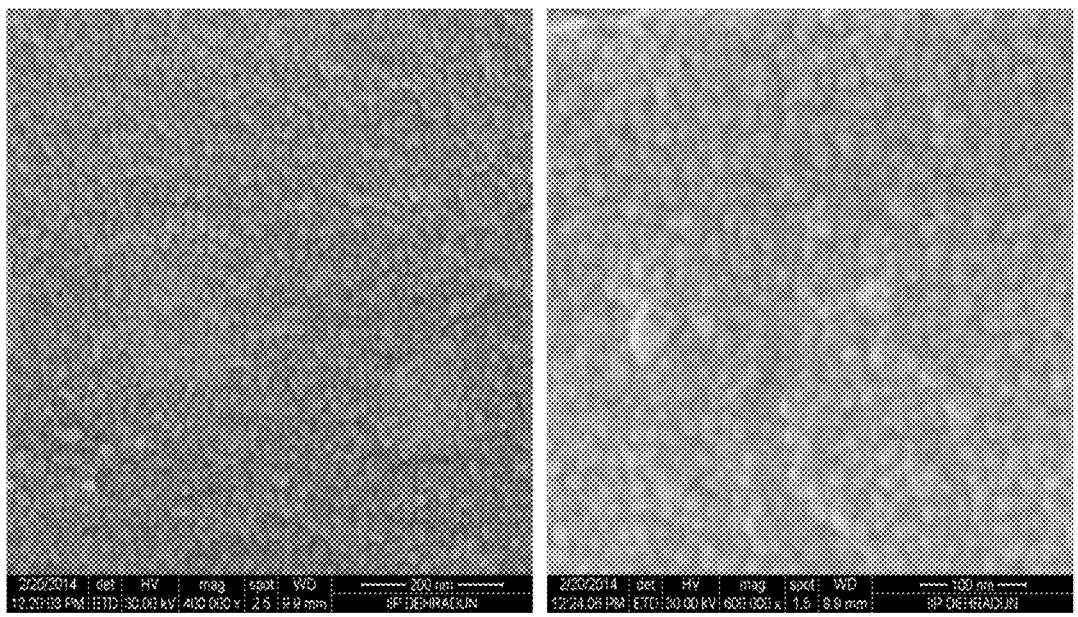
FIG. 3 represents Scanning Electron Microscope (SEM) images of the as prepared ZrO$_2$.
Figure 4:
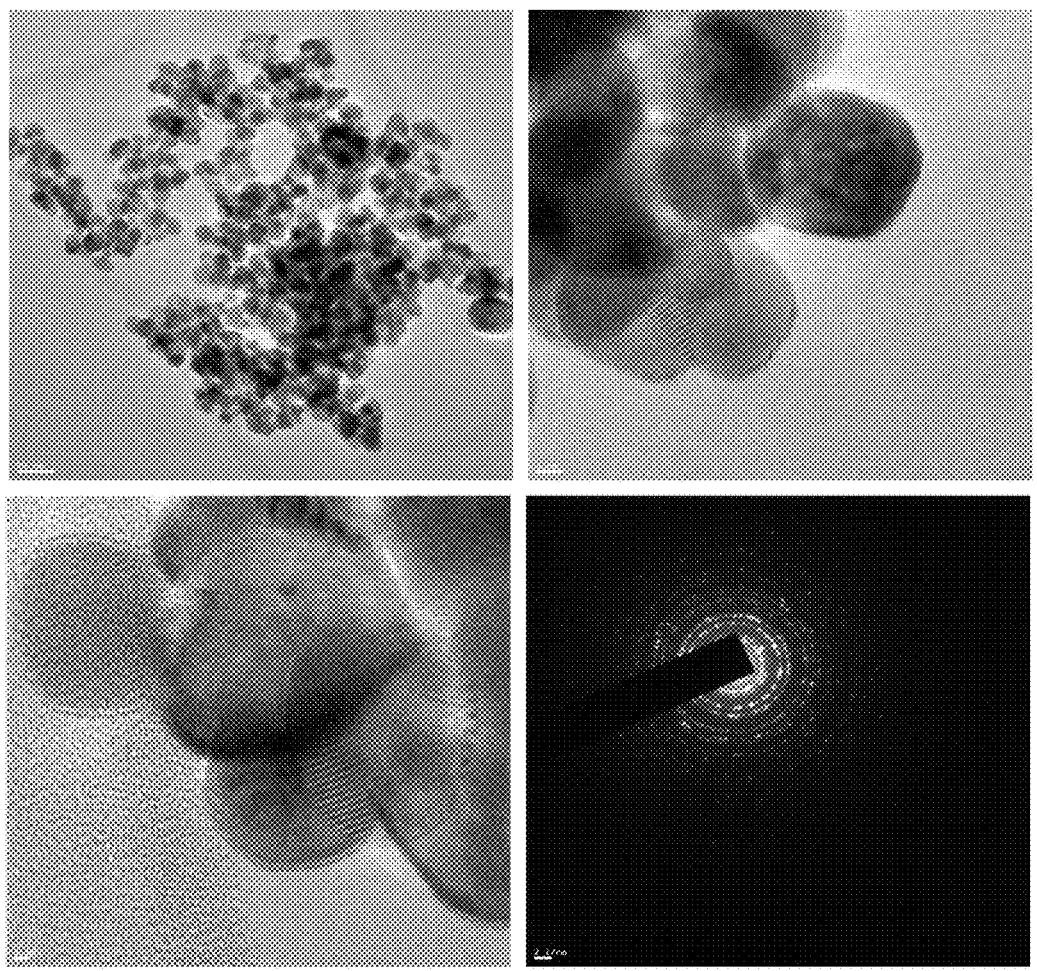
FIG. 4 represents Transmission Electron Microscope (TEM) images of the prepared catalyst.

The present invention provides a catalyst consisting of Ni—Pt—ZrO$_2$ prepared by colloidal as well as hydrothermal route and process to produce syngas from methane by gas phase combining the oxy- and dry reforming over Ni—Pt—ZrO$_2$ catalyst at atmospheric pressure, at a temperature range of 250 to 750° C. with a gas hourly space velocity (GHSV) in the range of 12000-42000 ml g$^{-1}$ h$^{-1}$ in the presence of Ni—Pt supported ZrO$_2$ catalyst with Ni—Pt to ZrO$_2$ weight ratio varied between 3 to 6% to obtain desired product syngas for a period of 1-100 hours.

The present invention related to process for oxy-dry reforming of natural gas for the production of syngas (a mixture of CO and H$_2$) over Ni—Pt—ZrO$_2$ catalyst which involves the following steps:

Synthesis of ZrO$_2$ oxide using of ZrOCl$_2$, ammonium hydroxide to adjust the pH between 3-10;

Heated at 60° C. after transferring the mixture to a stainless steel autoclave and maintained for 1-2 h;

Filtered the material by washing with excess water (2 liter) and checked by AgNO$_3$ solution followed by drying the materials in oven at a temperature between 100130° C. for 10-18 h;

Calcination of the materials at 300-800° C. for 4-6 h in air to get solid ZrO$_2$;

Synthesis of Ni—Pt—ZrO$_2$ catalyst was prepared using H$_2$PtCl$_6$.6H$_2$O (Sigma-Aldrich, ≥99%) and Ni(NO$_3$)$_2$.6H$_2$O (Sigma-Aldrich, ≥99%) as source of Pt and Ni dissolved in liquid octadecylamine (ODA) heated at 120° C.;

The weight ratio of Pt to ZrO$_2$ varied in the range of 0.5 to 4.0%;

The weight ratio of Ni to ZrO$_2$ varied in the range of 2 to 10.0%;

After homogenization the mixture was heated up to 220° C. after transferring the mixture to a stainless steel autoclave and stirred for 10 min. A measured amount nanoporous ZrO$_2$ was successively added and kept at starring for ½ h at same temperature. After the reaction, as—prepared Ni—Pt nanoparticles subjected for ultrasonic treatment for 1 min at room temperature after adding excess amount of concentrated nitric acid into it. The precipitate was cooled down to room temperature naturally, collected and washed with ethanol several times;

Calcination of the materials at 300-800° C. for 4-6 h in air to get Ni—Pt—ZrO$_2$;

Autothermal and dry reforming of methane was carried out in a fixed bed down-flow reactor using CH$_4$:CO$_2$:O$_2$:He in 1:1:0.5:7.5 ratio for 1-100 h to get methane;

The process pressure was kept at 1 atmosphere;

The reaction temperature is preferably in the range 250 to 750° C.;

The gas hourly space velocity (GHSV in ml g$^{-1}$ h$^{-1}$) is preferably in the range 12000 ml to 42000 ml g$^{-1}$ h$^{-1}$;

The methane conversion (mol %) of 54-99% with H$_2$/CO ratio of 1.14 to 1.42 (mol %).

The detailed steps of the process are:

The autothermal and dry reforming of methane was carried out in a fixed-bed down flow reactor at atmospheric pressure. Typically 200 mg of catalyst was placed in between two quartz wool plugged in the centre of the 6 mm quartz reactor and ATR was carried out in a temperature range of 250-750° C. The catalyst was reduced using 5% H$_2$ balance He at 700° C. for 1 h before the reaction. The gas hourly space velocity (GHSV) was varied between 12000 ml g$^{-1}$ h$^{-1}$ to 42000 ml g$^{-1}$ h$^{-1}$ with a molar ratio of CH$_4$:CO$_2$:O$_2$:He of 1:1:0.5:7.5. The reaction products were analyzed using an online gas chromatography (Agilent 7890A) fitted with a TCD detector using PoraPack-Q column.

An improved process for the preparation of Ni—Pt—ZrO$_2$ catalyst, wherein the said process comprising the steps of:

ZrOCl$_2$ was dissolved in water and 1N NH$_4$OH solution was added to adjust the pH between 3-10.

Heating the solution after transferring the mixture to a stainless steel autoclave at 60° C. and maintained for 1-2 h.

Filtered the material by washing with excess water (2 liter) followed by drying the materials in oven at a temperature between 100-130° C. for 10-18 h.

Calcination of the materials at 300-800° C. for 4-6 h in air to get solid ZrO$_2$.

Synthesis of Ni—Pt—ZrO$_2$ catalyst using H$_2$PtCl$_6$.6H$_2$O and Ni(NO$_3$)$_2$.6H$_2$O dissolved in liquid octadecylamine (ODA). After homogenization the mixture was heated up after transferring the mixture to a stainless steel autoclave to 220° C. and stirred for 10 min. A measured amount nanoporous ZrO$_2$ was successively added and continued starring for ½ h at same temperature. After the reaction, as-prepared Ni—Pt nanoparticles subjected for ultrasonic treatment for 1 min at room temperature after adding excess amount of concentrated nitric acid into it. The precipitate was cooled down to room temperature, collected and washed with ethanol several times.

The weight ratio of Pt to ZrO$_2$ is varied in the range of 0.5 to 4.0%.

The weight ratio of Ni to ZrO$_2$ is varied in the range of 2 to 10.0%.

Calcination of the materials at 300-800° C. for 4-6 h in air to get Ni—Pt—ZrO$_2$.

A process for autothermal and dry reforming of methane to produce syngas with Ni—Pt—ZrO$_2$ catalyst comprising the steps of:

Passing methane, CO$_2$ and O$_2$ at atmospheric pressure, at a temperature range of 250 750° C. with a gas hourly space velocity (GHSV) in the range of 12000-42000 ml g$^{-1}$ h$^{-1}$ in the presence of Ni—Pt supported ZrO$_2$ catalyst; to obtain syngas for a period of 1-100 hours.

Weight ratio of Ni to ZrO$_2$ was varied between 2 to 10% and Pt to ZrO$_2$ weight ratio varied between 0.5 to 4.0%.

Reactor pressure is preferably in the range of 1 atmosphere.

Reaction temperature is preferably in the range 250 to 750° C.

Gas hourly space velocity (GHSV) is preferably in the range of 12000 g ml l$^{-1}$ h$^{-1}$ to 42000 g ml$^{-1}$ h$^{-1}$.

Reaction time used is preferably in the range 1-100 h.

Conversion (mol %) of methane is in the range of 54-99% with H$_2$/CO ratio of 1.14 to 1.42 (mol %).

EXAMPLES

The following examples are given by way of illustration therefore should not be constructed to limit the scope of the invention.

Example—1

Synthesis of ZrO$_2$ 10 g (0.031 mol, 0.7 mol %) zirconium oxychloride was taken in 75 ml (4.17 mol, 99.3 mol %) distilled water to form a homogeneous solution, the pH of the solution was adjusted by ammonium hydroxide solution and pH of the mixed solution was fixed at 10. Finally, the mixed solution was heated at 60° C. after transferring the mixture to a stainless steel autoclave and maintained for 2 h. The resultant solid was collected by filtration, washed thoroughly with distilled water and ethanol and dried at 100° C. for 12 h. The as-synthesized material was calcined to 750° C. with a temperature ramp of 1.5° C./min under static air and kept at the same temperature for 5 h. This was used as a ZrO$_2$ support material.

Synthesis of Ni—Pt—ZrO$_2$

Synthesis of Ni—Pt—ZrO$_2$ catalyst was carried out taking 0.1 mmol (1.2 mmol %) H$_2$PtCl$_6$.6H$_2$O (Sigma-Aldrich, ≥99%) and 0.2 mmol (3.6 mmol %) of Ni(NO$_3$)$_2$.6H$_2$O (Sigma-Aldrich, ≥99%) dissolved in 10 ml (95 vol %) liquid octadecylamine (ODA) heated at 120° C. After the homogenization, the content was heated up to 220° C. after transferring the mixture to a stainless steel autoclave and stirred for 10 min. A measured amount, 1-2 grams (0.008-0.016 mol) of nanoporous ZrO$_2$ was successively added and kept at starring for ½ h at same temperature. After the reaction, as-prepared Pt—Ni nanoparticles subjected for ultrasonic treatment for 1 min at room temperature after adding excess amount of concentrated nitric acid into it. The precipitate was cooled down to room temperature naturally, collected and washed with ethanol several times. Finally the calcination of the material was carried out at 750° C. for 6 h in air.

The X-ray diffraction pattern, Scanning Electron Microscope (SEM) images and Transmission Electron Microscope (TEM) images of this material are given below.

Example—2

Synthesis of ZrO$_2$ 10 g (0.031 mol, 0.7 mol %) zirconium oxychloride was taken in 75 ml (4.17 mol, 99.3 mol %) distilled water to form a homogeneous solution, the pH of the solution was adjusted by ammonium hydroxide solution and pH of the mixed solution was fixed at 10. Finally, the mixed solution was heated at 60° C. after transferring the mixture to a stainless steel autoclave and maintained for 2 h. The resultant solid was collected by filtration, washed thoroughly with distilled water and ethanol, dried at 100° C. for 12 h followed by calcination at 750° C. This was used as a ZrO$_2$ support material.

Synthesis of Ni—Pt—ZrO$_2$

Synthesis of Ni—Pt—ZrO$_2$ catalyst was carried out taking 0.1 mmol (1.2 mmol %) H$_2$PtCl$_6$.6H$_2$O (Sigma-Aldrich, ≥99%) and 0.4 mmol (7.2 mmol %) of Ni(NO$_3$)$_2$.6H$_2$O (Sigma-Aldrich, ≥99%) dissolved in 10 ml (95 vol %) liquid octadecylamine (ODA) heated at 120° C. After the homogenization, the content was heated up to 220° C. after transferring the mixture to a lined stainless steel autoclave and stirred for 10 min. A measured amount 1-2 grams (0.008-0.016 mol) of nanoporous ZrO$_2$ was successively added and kept at stirring for ½ h at same temperature. After the reaction, as-prepared Pt—Ni nanoparticles subjected for ultrasonic treatment for 1 min at room temperature after adding excess amount of concentrated nitric acid into it. The precipitate was cooled down to room temperature naturally, collected and washed with ethanol several times. Finally the calcination of the material was carried out at 750° C. for 6 h in air.

The Transmission Electron Microscope (TEM) images of this material are given below.

Example 3

This example describes the autothermal and dry reforming of methane by gas phase reaction with CH$_4$:CO$_2$:O$_2$:He mole ratio 1:1:0.5: 7.5 using Ni—Pt—ZrO$_2$ nanocrystalline oxide as the catalyst. (Table—1)

The autothermal and dry reforming of methane ware carried out in a fixed-bed down flow quartz reactor at atmospheric pressure. Typically 200 mg of catalyst was placed in between two quartz wool plugged in the center of the 6 mm quartz reactor and reforming of methane was carried out in a temperature range of 250-750° C. The gas hourly space velocity (GHSV) was varied between 12000 ml g$^{-1}$ h$^{-1}$ to 42000 ml g$^{-1}$ h$^{-1}$ with a molar ratio of CH$_4$:CO$_2$:O$_2$:He is 1:1:0.5: 7.5

Process Conditions
Catalyst: 0.2 g
Ni:ZrO$_2$ wt % in the catalyst=4%
Pt:ZrO$_2$ wt % in the catalyst=2%
Pressure: 1 atmosphere
CH$_4$:CO$_2$:O$_2$: He mole ratio=1:1:0.5: 7.5
Total flow=40 ml/min (GHSV=12000), Reaction time: 1 h

TABLE 1

| Catalyst (Ni—Pt—ZrO$_2$) | Temperature (° C.) | Methane Conversion (mol %) | H$_2$/CO (mol %) |
|---|---|---|---|
| Combining Oxy- and dry reforming | 750 | 99.6 | 1.4 |

Example—4

The example describes the effect of temperature on methane conversion and H$_2$/CO ratio. The product analysis presented in Table—2.

Process Conditions:
Catalyst: 0.2 g
Ni: ZrO$_2$ wt % in the catalyst=4%
Pt: ZrO$_2$ wt % in the catalyst=2%
Pressure: 1 atmosphere
CH$_4$:CO$_2$:O$_2$:He mole ratio=1:1:0.5: 7.5
Total flow=40 ml/min (GHSV=12000)
Reaction time: 1 h

TABLE 2

Effect of temperature on methane conversion and H$_2$/CO ratio

| | Temperature (° C.) | Methane Conversion (mol %) | H$_2$/CO ratio (mol %) |
|---|---|---|---|
| Combining Oxy- and | 250 | 54.4 | 1.9 |
| | 350 | 46.3 | 1.7 |

TABLE 2-continued

Effect of temperature on methane conversion and $H_2$/CO ratio

|  | Temperature (° C.) | Methane Conversion (mol %) | $H_2$/CO ratio (mol %) |
|---|---|---|---|
| dry reforming | 450 | 39.9 | 1.6 |
|  | 550 | 67.3 | 1.3 |
|  | 650 | 93.6 | 1.4 |
|  | 750 | 99.6 | 1.4 |

Example —5

The example describes the effect of time on stream on methane conversion and CO/$H_2$ ratio. The product analysis presented in Table 3
Process Conditions:
Catalyst: 0.2 g,
Ni: $ZrO_2$ wt % in the catalyst=4%
Pt: $ZrO_2$ wt % in the catalyst=2%
Pressure: 1 atmosphere
$CH_4$:$CO_2$:$O_2$:he mole ratio=1:1:0.5: 7.5
Total flow=40 ml/min (GHSV=12000), Reaction temperature: 750° C.

TABLE 3

Effect of time-on-stream on oxy-dry reforming of methane

|  | Time (h) | Methane Conversion (mol %) |
|---|---|---|
| oxy-dry reforming of methane | 0 | 99.6 |
|  | 1 | 99.1 |
|  | 4 | 99.4 |
|  | 8 | 99.8 |
|  | 12 | 99.5 |
|  | 16 | 99.2 |
|  | 20 | 99.7 |
|  | 25 | 99.1 |
|  | 30 | 99.6 |
|  | 35 | 99.2 |
|  | 40 | 99.8 |
|  | 45 | 99.4 |
|  | 50 | 99.6 |
|  | 55 | 99.6 |
|  | 60 | 99.9 |
|  | 65 | 99.3 |
|  | 70 | 99.5 |

Example—6

The example describes the effect of gas hourly space velocity (GHSV) on methane conversion and $H_2$/CO ratio. The product analysis presented in Table—3.
Process Conditions:
Catalyst: 0.2 g
Ni: $ZrO_2$ wt % in the catalyst=4%
Pt: $ZrO_2$ wt % in the catalyst=2%
Pressure: 1 atmosphere
$CH_4$:$CO_2$:$O_2$:He mole ratio=1:1:0.5: 7.5
Reaction temperature: 750° C.
Reaction time: 1 h

TABLE 4

Effect of gas hourly space velocity (GHSV) on methane conversion and $H_2$/CO ratio

|  | GHSV (ml g$^{-1}$ h$^{-1}$) | Methane Conversion (mol %) | $H_2$/CO (mol %) |
|---|---|---|---|
| Combining Oxy- and dry reforming | 12000 | 99.6 | 1.42 |
|  | 18000 | 99.1 | 1.44 |
|  | 24000 | 97.9 | 1.45 |
|  | 30000 | 95.6 | 1.46 |
|  | 36000 | 95.3 | 1.47 |
|  | 42000 | 84.9 | 1.49 |

ADVANTAGES OF THE INVENTION

The main advantages of the present invention are:
The process of the present invention converts methane to synthesis gas along with carbon dioxide and oxygen in a single step with a single catalyst.
The process provides not only good conversion but also good $H_2$/CO ratio in the synthesis gas.
The process runs at atmospheric pressure in a continuous process to achieve 99.6% methane conversion, which is also a major advantage of this process.
The exothermic oxy-reforming is coupled with endothermic dry-reforming to produce $H_2$/CO which is the major advantage of the process.
The catalyst is used in very low amounts.
The catalyst does not deactivate till 1000 h with the reaction stream.

We claim:
1. A process for the preparation of Ni—Pt—$ZrO_2$ nanocrystalline oxide catalyst, wherein said process comprises the steps of:
  i. dissolving 0.025 to 0.0372 mol of $ZrOCl_2$ in 2.78 to 5.56 mol of water, wherein the mole ratio of $ZrOCl_2$:$H_2O$ ranges from 180 to 400 in the solution with the pH adjusted in the range of 3-10 using $NH_4OH$ solution;
  ii. transferring the mixture of step i) to a stainless steel autoclave and heating at a temperature in the range of 50 to 70° C. for a period in the range of 1 to 2 hrs to obtain a white precipitate;
  iii. filtering, washing and drying the white precipitate as obtained in step ii) at a temperature in the range of 100 to 130° C. for a period in the range of 10 to 18 hrs;
  iv. calcining the materials as obtained in step iii) at a temperature in the range of 300 to 800° C. for a period in the range of 4 to 6 hrs in air to get solid $ZrO_2$;
  v. mixing 0.1-0.3 mmol of $H_2PtCl_6$.$6H_2O$ and 0.2-0.4 mmol of $Ni(NO_3)_2$.$6H_2O$ in 70 to 95 vol % of liquid octadecylamine (ODA), heating the mixture at a temperature in the range of 100-140° C., further heating the content up to 220° C. after transferring the mixture to a lined stainless steel autoclave and stirring for 10 minutes followed by adding 0.008 to 0.016 mol of $ZrO_2$, a support material as obtained in step iv) with the weight of $ZrO_2$ maintained in the range of 86-97.5% of the combined weight of Ni, Pt and $ZrO_2$;
  vi. stirring the mixture as obtained in step v) for a period in the range of 1 to 2 h, and subjecting the reaction mixture for ultrasonic treatment for a period in the range of 40-60 minutes at room temperature in the range of 25-35° C. after adding concentrated nitric acid in the range of 2.0-5.0 ml to obtain a precipitate;

vii. cooling the precipitate of step vi) to room temperature in the range of 25-35° C., collecting and washing the cooled precipitate with ethanol for 2-3 times followed by drying the materials in an oven at a temperature ranging from 100 to 130° C. for a period in the range of 10 to 18 h; and viii. calcining the material of step vii) at a temperature in the range of 300 to 800° C. for a period in the range of 4 to 6 h in air to obtain nanocrystalline oxide Ni—Pt—$ZrO_2$ catalyst:

wherein the Ni—Pt—$ZrO_2$ nanocrystalline oxide catalyst has 2-10 wt % of Ni, 0.5 to 4 wt % of Pt, 86 to 97.5 wt % of $ZrO_2$, and a particle size in the range of 30-80 nm.

* * * * *